(12) United States Patent
Galka et al.

(10) Patent No.: US 9,298,949 B2
(45) Date of Patent: Mar. 29, 2016

(54) METHOD FOR PROGRAMMING A MOBILE END DEVICE CHIP

(75) Inventors: Gero Galka, Valley (DE); Stephan Spitz, Karlsfeld (DE); Claus Dietze, Obersochering (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 222 days.

(21) Appl. No.: 13/983,813

(22) PCT Filed: Feb. 6, 2012

(86) PCT No.: PCT/EP2012/000534
§ 371 (c)(1),
(2), (4) Date: Aug. 6, 2013

(87) PCT Pub. No.: WO2012/107200
PCT Pub. Date: Aug. 16, 2012

(65) Prior Publication Data
US 2013/0318638 A1    Nov. 28, 2013

(30) Foreign Application Priority Data
Feb. 8, 2011  (DE) .................. 10 2011 010 627

(51) Int. Cl.
G06F 21/00  (2013.01)
G06F 21/73  (2013.01)
G06F 21/10  (2013.01)
G06F 21/57  (2013.01)
(52) U.S. Cl.
CPC ................ *G06F 21/73* (2013.01); *G06F 21/10* (2013.01); *G06F 21/572* (2013.01)

(58) Field of Classification Search
CPC ........ G06F 21/73; G06F 21/10; G06F 21/572
See application file for complete search history.

(56) References Cited

U.S. PATENT DOCUMENTS

| 5,603,084 | A | * | 2/1997 | Henry et al. .................. 455/419 |
| 5,734,819 | A |   | 3/1998 | Lewis |
| 6,647,402 | B1 | * | 11/2003 | Chiu ....................... G06F 7/588 708/250 |
| 7,203,835 | B2 |   | 4/2007 | Multerer et al. |
| 7,487,352 | B2 |   | 2/2009 | Chen et al. |
| 7,496,200 | B2 |   | 2/2009 | Multerer et al. |
| 7,496,202 | B2 |   | 2/2009 | Multerer et al. |

(Continued)

FOREIGN PATENT DOCUMENTS

| EP | 0707270 A2 | 4/1996 |
| EP | 1310284 A2 | 5/2003 |

(Continued)

OTHER PUBLICATIONS

International Search Report from corresponding PCT Application No. PCT/EP/2012/000534, Apr. 24, 2012.

*Primary Examiner* — Michael Pyzocha
(74) *Attorney, Agent, or Firm* — Workman Nydegger

(57) ABSTRACT

The invention provides a method for programming a chip for a mobile end device, wherein, in a preparatory step, a serial number is programmed into the chip and thereafter, in a programming step, the serial number is verified and a programming of at least one further datum into the chip is only carried out if the serial number has been successfully verified. The serial number is verified here by means of a security module (HSM), while employing a secret information item stored in the security module (HSM) and different from the serial number.

14 Claims, 1 Drawing Sheet

SENR = F (X)

(56) References Cited

U.S. PATENT DOCUMENTS

| | | | |
|---|---|---|---|
| 7,908,216 B1* | 3/2011 | Davis et al. | 705/41 |
| 7,984,849 B2* | 7/2011 | Berghel et al. | 235/380 |
| 8,001,383 B2* | 8/2011 | Hughes | G06F 21/10 713/171 |
| 8,484,449 B2* | 7/2013 | Yasuda et al. | 713/2 |
| 2003/0084346 A1* | 5/2003 | Kozuch et al. | 713/201 |
| 2003/0093668 A1 | 5/2003 | Multerer et al. | |
| 2003/0216927 A1* | 11/2003 | Sridhar et al. | 705/1 |
| 2004/0179482 A1* | 9/2004 | Rusu | H04L 29/12254 370/254 |
| 2004/0179699 A1* | 9/2004 | Moeller | G10K 11/175 381/73.1 |
| 2005/0129237 A1 | 6/2005 | Multerer et al. | |
| 2005/0129238 A1 | 6/2005 | Multerer et al. | |
| 2005/0152552 A1 | 7/2005 | Multerer et al. | |
| 2005/0166051 A1* | 7/2005 | Buer | 713/173 |
| 2005/0182952 A1* | 8/2005 | Shinozaki | 713/189 |
| 2006/0015737 A1* | 1/2006 | Canard | G06Q 20/383 713/177 |
| 2006/0075254 A1* | 4/2006 | Henniger | 713/184 |
| 2006/0123190 A1* | 6/2006 | Weirauch | G06F 3/0619 711/112 |
| 2007/0094507 A1* | 4/2007 | Rush | 713/176 |
| 2007/0095927 A1 | 5/2007 | Pesonen | |
| 2007/0124413 A1 | 5/2007 | Diab et al. | |
| 2007/0170252 A1* | 7/2007 | Orton | 235/386 |
| 2007/0296403 A1 | 12/2007 | Mori et al. | |
| 2008/0104413 A1* | 5/2008 | Brunet | G06Q 10/06 713/185 |
| 2008/0172557 A1* | 7/2008 | Crowder et al. | 713/2 |
| 2008/0189549 A1 | 8/2008 | Hughes | |
| 2009/0270071 A1* | 10/2009 | Kuo et al. | 455/411 |
| 2010/0045427 A1* | 2/2010 | Boone et al. | 340/5.23 |
| 2010/0140344 A1 | 6/2010 | Toofan et al. | |
| 2010/0275027 A1* | 10/2010 | Belrose et al. | 713/176 |
| 2011/0091040 A1* | 4/2011 | Krysiak | G06Q 20/3558 380/283 |
| 2011/0154006 A1* | 6/2011 | Natu et al. | 713/2 |
| 2011/0296532 A1 | 12/2011 | Hughes | |
| 2012/0054107 A1* | 3/2012 | Biswas et al. | 705/53 |
| 2012/0204032 A1* | 8/2012 | Wilkins | H04L 9/006 713/170 |

FOREIGN PATENT DOCUMENTS

| | | |
|---|---|---|
| WO | 03/073688 A1 | 9/2003 |
| WO | 2008/095193 A1 | 8/2008 |

* cited by examiner

SENR = F (X)

SENR = ARB; SIG = SIG(SENR, K)

METHOD FOR PROGRAMMING A MOBILE END DEVICE CHIP

BACKGROUND

This invention relates to a method for programming a mobile end device chip, a method for activating a security operating system while using the programming method, and a method for securely configuring a mobile end device containing a chip while using the programming method.

SUMMARY

Mobile end devices such as e.g. mobile telephones, smart phones and the like contain a chip (microprocessor chip) having an integrated circuit (IC), also called SoC (system on chip), through which the mobile end device including its components such as e.g. display screen, keyboard, card reader for SIM cards and/or other cards is controlled.

The chip is manufactured by a chip manufacturer (also designated SoC provider, SoCP), made available to an end device manufacturer different from the chip manufacturer (also designated original equipment manufacturer, OEM), and programmed with an operating system (i.e. an operating system is programmed into the chip) and installed into a mobile end device by the end device manufacturer. The operating system for the chip is normally not produced by the end device manufacturer, but by the chip manufacturer or an operating system maker affiliated with the chip manufacturer. Because peculiarities of the mobile end device for which the chip is intended are to be taken into consideration in the operating system, however, the operating system is not programmed into the chip by the chip manufacturer right away, but by the end device manufacturer. Between the manufacture of the chip and the making available of the chip to the end device manufacturer, programming steps are normally performed by the chip manufacturer and/or companies affiliated with the chip manufacturer, these steps not being the subject matter of the present patent application.

The programming of the chip outside the sphere of influence of the chip manufacturer gives rise to a risk of forged chips, often called gray chips, being made available to the end device manufacturer that do not come from the chip manufacturer, and that possibly have different properties to original chips from the chip manufacturer. The end device manufacturer has an interest in implementing original chips from the chip manufacturer with assured properties into its mobile end devices. The chip manufacturer in turn has an interest in the operating system intended for its chips being programmed only into its chips, not into chips of different origin.

At the current stage, serial numbers are programmed into the chips by the chip manufacturer for defending against gray chips. Before further data such as e.g. the operating system are programmed into a chip by the end device manufacturer, the serial number of the chip is checked. On the basis of serial number lists including all valid serial numbers the end device manufacturer can recognize whether the chip has a valid serial number. Chips without valid serial numbers are not programmed.

Serial number lists can be very extensive, which makes their handling laborious and troublesome. Moreover, secure transfer of the serial number lists between the chip manufacturer and the end device manufacturer and any further parties involves high effort.

The applicant of the present patent application manufactures and sells under the brand name MOBICORE a security operating system for chips to be implemented into mobile (radio) end devices (e.g. mobile telephones, smart phones). Security-critical applications and some system functions (e.g. keyboard driver) are controlled by the security operating system MOBICORE in a secure manner. Further applications and other system functions (e.g. currently the display screen driver) are controlled by a normal operating system existing alongside the security operating system. The security operating system comprises a cryptographic key, the authentication key Kauth by means of which the security operating system can identify itself to a background system. Optionally, the authentication key Kauth is additionally provided for operating a secure communication channel between the chip or mobile end device and the background system. The background system is for example a per se known background system of a mobile radio network.

The invention is based on the object of providing an efficient and secure method for programming a mobile end device chip wherein the programming is granted only at most for chips from a predetermined origin. In particular, there is to be provided such a method that does without serial number lists. Further, according to developments of the invention there are to be stated a method for activating a security operating system and a method for securely configuring a mobile end device containing a chip, respectively while using the programming method.

This object is achieved by a method according to claim 1. Advantageous embodiments of the invention are stated in the dependent claims.

The method according to claim 1 is configured for programming a chip for a mobile end device. In a preparatory step, a serial number is programmed into the chip. Thereafter, in a programming step, the serial number is verified and a programming of at least one further datum into the chip is carried out only if the serial number has been successfully verified. The method is characterized in that the serial number is verifiable by means of a security module, while employing a secret information item stored in the security module and different from the serial number. The "further datum" is understood here to be any kind of data, for example program code (e.g. an operating system, cf. below) or single data (e.g. a cryptographic (authentication) key) that are intended for interaction with program code.

Since the serial number is verifiable while employing the secret information item stored in the security module, there is required for verifying the serial number only the security module, and no serial number list. The method is thus at least as secure as a method with a serial number check on the basis of serial number lists, but substantially more efficient, because no serial number lists need to be handled.

Hence, according to claim 1 there is provided an efficient and secure method for programming a mobile end device chip with a check of origin for the chip.

Optionally, in reaction to the successful verification of the serial number the further datum is programmed into the chip by means of the security module directly, and without any possibility for intervening from outside the security module. It is thus achieved that after the successful verification of the serial number the further datum can be exclusively allocated to and programmed into the chip whose serial number was just verified. It is not possible, however, to exchange the chip for another chip after the verification of the serial number and before the programming of the further datum into the chip. Thus, it is ensured that only chips with an authentic origin get the further datum programmed in.

Optionally, the serial number is verified by the serial number or an information item dependent on the serial number being reproduced, i.e. generated again, while employing the secret information item. In the second case, the information item dependent on the serial number is preferably programmed into the chip additionally in the preparatory step.

According to a first embodiment, the serial number is formed by a mapping rule and the mapping rule is stored in the security module as the secret information item. In this case, for verifying the serial number the serial number is read out from the chip by means of the security module, the serial number is generated again in the security module by means of the stored mapping rule, the read-out and the newly generated serial numbers are compared—preferably also in the security module—and in case of a match the serial number is regarded as verified. The mapping rule processes input data which can comprise e.g. a random number and further data, and generates the serial number therefrom.

According to a second embodiment, there is stored in the chip, in addition to the serial number, a digital signature formed while employing the serial number and a secret key and the secret key is stored in the security module as the secret information item. In this case, for verifying the serial number the serial number and the digital signature are read out from the chip by means of the security module, the signature is generated again in the security module by means of the read-out serial number and the secret key stored in the security module, the read-out and the newly generated signatures are compared—preferably also in the security module—and in case of a match of the signatures the serial number is regarded as verified.

Optionally, the secret information item is stored in the security module so as to be secured against readout. For example, a direct readout of the secret information item is not possible, or only at most after successful authentication to the security module. The secret information item is employed within the security module for verifying the serial number of the chip without passing out of the security module.

Optionally, there is provided as a further datum a security operating system or at least a part of a security operating system. For example, in the programming step the security operating system is programmed into the chip only in the case that the serial number has been successfully verified.

Optionally, there is provided as a further datum a cryptographic key, e.g. authentication key, required for an operability of a security operating system implemented, or yet to be implemented, in the chip. The security operating system itself is programmed into the chip optionally before or after the verification of the serial number, or alternatively partly therebefore and partly thereafter. Optionally, there is provided as a further datum the authentication key Kauth of the above-described security operating system MOBICORE.

Optionally, the cryptographic key, e.g. authentication key, is generated in the security module, optionally directly in reaction to the successful verification of the serial number. The generated key is subsequently programmed into the chip, optionally without any possibility for intervening from outside the security module.

Optionally, the cryptographic key is generated while employing the serial number. As a result, the cryptographic key is dependent on the serial number, and thus the cryptographic key is unique to the chip just as the serial number is.

A method for activating a security operating system is carried out through a method for programming a chip wherein, as described hereinabove, in the preparatory step the serial number is programmed into the chip. As the further datum there is provided a cryptographic key, in particular authentication key, required for an operability of a security operating system. In the method for activating the security operating system the security operating system with the exception of the cryptographic key is additionally programmed into the chip and thereby implemented in the chip. In the programming step the programming of the cryptographic key into the chip is only carried out if the serial number has been successfully verified. By the key being programmed into the chip, the security operating system is activated and thus is operable as of this programming operation.

The method is applicable especially advantageously for a work-sharing programming of a chip for a mobile end device, the programming of the chip being shared for example between a chip manufacturer and an end device manufacturer (e.g. mobile radio end device manufacturer).

Optionally, the preparatory step is carried out by a first programmer (e.g. the chip manufacturer), and the programming step is carried out by a second programmer separated logically and/or spatially from the first programmer (e.g. the end device manufacturer). Because the verification of the serial numbers does without serial number lists and requires only the security module, there is no longer a need, as hitherto, for serial number lists to be exchanged between the first and second programmers, e.g. between the chip manufacturer and the end device manufacturer.

Optionally, the secret information item is programmed into the security module by the first programmer (e.g. the chip manufacturer), and the security module is made available to the second programmer (e.g. the end device manufacturer) for carrying out the programming step.

The security module is optionally designed as a complete system having a cryptoprocessor, a memory for secret information and a control unit for chip programming. Optionally, the memory is readable exclusively by the cryptoprocessor. The cryptoprocessor is configured to carry out cryptographic computations, e.g. signature computations, serial number computations according to algorithms, comparison operations, key generation, in particular generation of an authentication key Kauth for a Mobicore security operating system, while employing secret information stored in the memory. The control unit for chip programming is configured to program chips. Preferably, the cryptoprocessor and the control unit for chip programming are coupled with each other such that the chip programming is controllable directly by computational results of the cryptoprocessor.

According to a first development of the invention, in the programming step there is generated in the security module a verification data set comprising at least the secret information item, by means of which data set the serial number is verifiable. The verification data set is sent to a background system. In a verification step temporally following the programming step, the serial number is verified again with the background system by means of the verification data set, the chip being accepted if the serial number has been successfully verified in the verification step and the chip being discarded if the serial number has not been successfully verified in the verification step. The verification step is carried out for example when a mobile end device containing the chip registers with the background system.

Optionally, in the first development of the invention, in the programming step a key-serial number datum dependent on the key and the serial number is generated, as at least a part of the verification data set, for example by the key and the serial number being processed to the key-serial number datum by means of an algorithm G and sent to the background system. In the verification step the key-serial number datum is verified, in addition to the serial number or instead of the serial number, by means of the verification data set, for example by the key-serial number datum being computed again. If needed, the verification data set comprises the algorithm G.

In a method according to the invention for securely configuring a mobile end device containing a chip, for a mobile radio system, according to a second development of the invention, there is carried out on the chip a preparatory step (comprising in particular programming in the serial number and, where applicable, the signature) and a programming step (comprising in particular verifying the serial number and, where applicable, programming in the further datum, e.g. (authentication) key), as described hereinabove. Subsequently, the chip is brought into data exchange connection with a background system of the mobile radio system in order to register the mobile end device with the background system, with the aim that the mobile end device is subsequently utilizable in the mobile radio system, e.g. for telephoning, data exchange and other applications customary for mobile end devices. Thereafter, a second verification step is carried out according to the development of the invention, e.g. via the data exchange connection. Only in the case that the serial number and/or the key-serial number datum has been successfully verified in the second verification step is the mobile radio device registered with the background system. As a result, a further securing means is installed in the life cycle of the mobile end device, thereby ensuring that only mobile end devices having an original chip—and, where applicable, original security operating system—can take part in the mobile radio system.

BRIEF DESCRIPTION OF THE DRAWINGS

Hereinafter the invention will be explained more closely on the basis of exemplary embodiments and with reference to the drawing, in which there are shown.

DETAILED DESCRIPTION OF VARIOUS EMBODIMENTS

Figure 1:
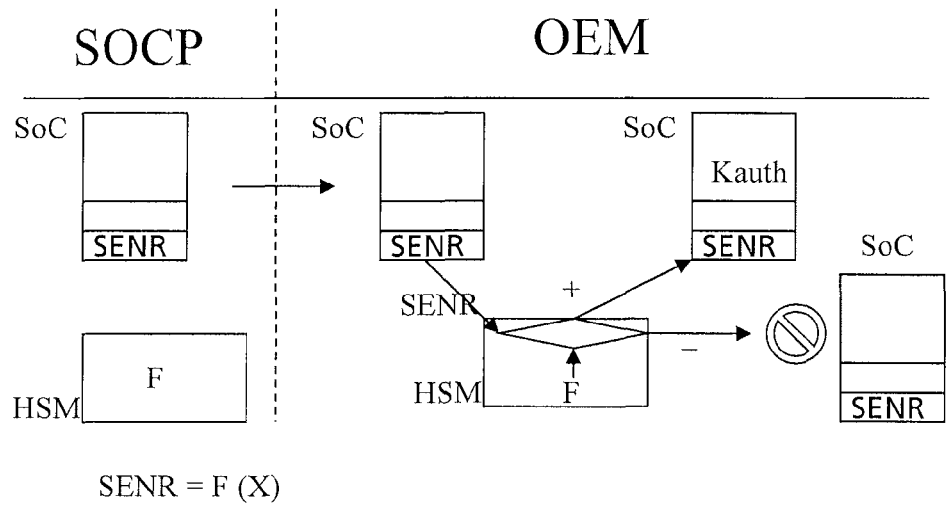
FIG. 1 a system for illustrating a first embodiment of the invention, comprising a first development.

FIG. 1 shows a system for illustrating a first embodiment of the invention wherein the programming of a chip SoC for a mobile radio end device is secured by means of a serial number SENR which is formed according to a secret mapping rule F. The aim of the programming is to have a security operating system programmed into a chip SoC (system on chip), manufactured by a chip manufacturer SOCP (SOC provider), by a mobile radio end device manufacturer OEM (original equipment manufacturer). In so doing, it is to be ensured that only original chips of the chip manufacturer SoCP are provided with an operable security operating system. The security operating system comprises an authentication key Kauth without which the security operating system is not operable. The chip manufacturer SOCP programs into the chip SoC the serial number SENR formed according to the secret mapping rule F, and into a security module HSM (high security module) the secret mapping rule F. The chip manufacturer SOCP delivers the chip SoC and the security module HSM to the end device manufacturer OEM. Normally, the chip manufacturer SOCP delivers a multiplicity of thus prepared chips SoC to the end device manufacturer OEM. The end device manufacturer OEM integrates the security module HSM in the proper way into its production chain for chip programming. As a result, each programming operation for programming the chip SoC is controlled by the security module HSM, this being possible exclusively under the control of the security module HSM. First, the end device manufacturer OEM programs the security operating system with the exception of the authentication key Kauth into the chip SoC. The authentication key Kauth does not yet exist at this time. As soon as a programming command is issued at the end device manufacturer OEM to program the authentication key Kauth into the chip SoC, the security module HSM reads out the serial number SENR from the chip SoC, forms the serial number SENR again by means of the read-out serial number SENR and the secret mapping rule F stored in the security module HSM, and compares the read-out and the newly formed serial numbers SENR. Only if the read-out and the newly formed SENR match is the serial number regarded as verified in the security module HSM, and the authentication key Kauth generated directly in reaction to the verification in the security module HSM. The authentication key Kauth is generated by a cryptographic computation from the serial number SENR and further input data, so that the authentication key Kauth is thus unique, and specific to the chip SoC, just as the serial number SENR is. The generated authentication key Kauth is programmed into the chip SoC, without any possibility for intervening from outside the security module HSM. As a result, the security operating system is activated. If the serial numbers are different, however, an error message is output and/or the chip programming aborted, optionally also an error handling measure taken, such as e.g. erasure of memories of the chip SoC. In this case the security operating system is thus not activated.

Figure 2:
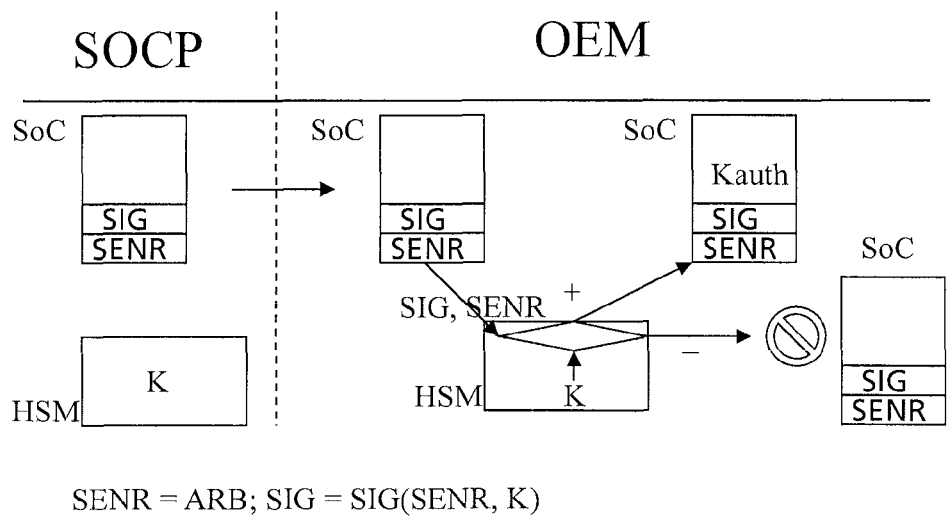
FIG. 2 a system for illustrating a second embodiment of the invention, comprising the first development.

FIG. 2 shows a system for illustrating a second embodiment of the invention wherein the programming of a chip SoC for a mobile radio end device is secured by means of a serial number SENR and a signature SIG over the serial number SENR. The basic conditions for the chip programming are as described for FIG. 1. In contrast to the embodiment from FIG. 1, the chip manufacturer SoCP programs into the chip SoC in the embodiment from FIG. 2 the serial number SENR and a signature SIG generated by encryption of the serial number SENR with a secret cryptographic key K. Moreover, the chip manufacturer SOCP programs the secret cryptographic key K into the security module HSM. As soon as a programming command is issued to program the authentication key Kauth into the chip SoC, the security module HSM reads out the signature SIG and the serial number SENR from the chip SoC, forms the signature SIG again by means of the read-out serial number SENR and the secret key K stored in the security module HSM, and compares the read-out and the newly formed signatures SIG. If the signatures are different, an error message is output and/or the chip programming aborted, optionally also an error handling measure taken, such as e.g. erasure of memories of the chip SoC. If the stored and newly formed signatures SIG match, the serial number SENR is regarded as verified. In reaction to the verification the authentication key Kauth is formed (computed) and programmed into the chip SoC, and thus the security operating system activated, as described for FIG. 1.

Figure 3:
FIG. 3 a system for illustrating a second development of the invention.

FIG. 3 shows a system for representing developments of the invention, with the additional step of registering a mobile end device containing the chip SoC with a background system BS of a mobile radio system. Up to the verification of the serial number SENR in the security module HSM and, where applicable, generation of the authentication key Kauth and storage of the same in the security module HSM, the procedure is the same as described with reference to FIG. 1 or FIG. 2. Additionally, after the authentication key Kauth has been generated in the security module HSM and programmed into the chip SoC, a key-serial number datum SSD=G(F, Kauth, SENR) or SSD=G(K, Kauth, SENR) is generated by means of an algorithm G and while employing the secret information item (algorithm F or key K) and the serial number SENR. The key-serial number datum SSD, the serial number SENR and the secret information item, F or K, constitute a verification data set for a later verification of the serial number of the chip SoC. The verification data set is sent to a background system BS of a mobile radio system via a secure data connection which the end device manufacturer OEM cannot influence. Later, after the mobile end device in which the chip SoC is contained is sold to an end customer, the mobile end device must be registered for the first time with the background system BS to be operable in the mobile radio system. Upon the attempt to register the mobile end device with the background system BS, the serial number SENR of the chip SoC is verified again by means of the key-serial number datum SSD. Only if the serial number SENR is successfully verified is the mobile end device registered with the background system BS and, as a result, the participation in the mobile radio system with the mobile end device enabled.

The invention claimed is:

1. A method for programming a chip for a mobile end device, comprising the steps of:
   in a preparatory step a serial number is programmed into the chip; and then
   in a programming step, the serial number is verified and a programming of at least one further datum into the chip is only carried out if the serial number has been successfully verified, the further datum comprising a cryptographic key required for operability of a security operating system implemented, or yet to be implemented, in the chip, the cryptographic key being generated based on the serial number, such that the cryptographic key is unique to the chip;
   wherein the serial number programmed into the chip is verified by means of a security module configured to regenerate the serial number using a secret mapping rule and further determine whether the serial number programmed into the chip matches the regenerated serial number, the mapping rule being stored in the security module as a secret information item.

2. The method according to claim 1, wherein the serial number is verified by the serial number or an information item dependent on the serial number being reproduced while employing the secret information item.

3. The method according to claim 1, wherein, in addition to the serial number, a digital signature is formed while employing the serial number and a secret key is stored in the chip, and the secret key is stored in the security module as the secret information item.

4. The method according to claim 1, wherein the secret information item is stored in the security module so as to be secured against readout.

5. The method according to claim 1, wherein a security operating system or at least a part of a security operating system is provided as the further datum.

6. The method according to claim 1, wherein the cryptographic key is generated in the security module.

7. The method according to claim 1, wherein the cryptographic key is generated while employing the serial number.

8. The method according to claim 1, further comprising activating a security operating system, wherein
   additionally the security operating system with the exception of the cryptographic key is programmed into the chip and thereby implemented; and in the programming step the programming of the cryptographic key into the chip is only carried out if the serial number has been successfully verified.

9. The method according to claim 1, wherein the preparatory step is carried out by a first programmer and wherein the programming step is carried out by a second programmer separated logically and/or spatially from the first programmer.

10. The method according to claim 9, wherein the secret information item is programmed into the security module by the first programmer, and the security module is made available to the second programmer for the programming step.

11. The method according to claim 1, wherein
   in the programming step there is generated in the security module a verification data set comprising at least the secret information item by means of which data set the serial number is verifiable, and the verification data set is sent to a background system; and
   in a verification step temporally following the programming step, the serial number is verified again with the background system by means of the verification data set, and the chip is accepted if the serial number has been successfully verified in the verification step, and the chip is discarded if the serial number has not been successfully verified in the verification step.

12. The method according to claim 11, wherein
   in the programming step a key-serial number datum dependent on the key and the serial number is generated as at least a part of the verification data set and sent to the background system; and
   in the verification step the key-serial number datum is verified, in addition to the serial number or instead of the serial number, by means of the verification data set.

13. A method for securely configuring a mobile end device containing a chip, for a mobile radio system, comprising the steps of:
   in a preparatory step a serial number is programmed into the chip; and then
   in a programming step, the serial number is verified and a programming of at least one further datum into the chip is only carried out if the serial number has been successfully verified, the further datum comprising a cryptographic key required for operability of a security operating system implemented, or yet to be implemented, in the chip, the cryptographic key being generated based on the serial number, such that the cryptographic key is unique to the chip;
   verifying the serial number programmed into the chip by means of a security module configured to regenerate the serial number using a secret mapping rule and further determine whether the serial number programmed into the chip matches the regenerated serial number, the mapping rule being stored in the security module as a secret information item;
   bringing the chip into data exchange connection with a background system of the mobile radio system in order to register the mobile end device with the background system;
   in a verification step temporally following the programming step, the serial number is verified again with the background system by means of the verification data set, and the chip is accepted if the serial number has been successfully verified in the verification step, and the chip is discarded if the serial number has not been successfully verified in the verification step; and
   wherein only in the case that the serial number and/or the key-serial number datum has been successfully verified in the verification step is the mobile radio device registered with the background system.

14. The method according to claim 13, wherein in the programming step a key-serial number datum dependent on the key and the serial number is generated as at least a part of the verification data set and sent to the background system; and in the verification step the key-serial number datum is verified, in addition to the serial number or instead of the serial number, by means of the verification data set.

* * * * *